United States Patent
Ciemniecki et al.

(10) Patent No.: US 6,296,588 B1
(45) Date of Patent: Oct. 2, 2001

(54) HIGH TEMPERATURE FLEXIBLE THERMOPLASTIC COMPOSITES FOR ENDLESS BELT DRIVING SURFACES

(75) Inventors: Scott L. Ciemniecki, Birmingham, MI (US); Ronald A. L. Rorrer, Highlands Ranch; Harry D. Visser, Lakewood, both of CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/330,798

(22) Filed: Jun. 11, 1999

Related U.S. Application Data
(60) Provisional application No. 60/089,016, filed on Jun. 12, 1998.

(51) Int. Cl.$^7$ .............................. F16G 5/00; F16G 5/20; B29H 7/27
(52) U.S. Cl. ............................................................. 474/268
(58) Field of Search .................................. 474/263, 264, 474/266, 268, 271, 260, 143, 207; 524/496; 104/88

(56) References Cited

U.S. PATENT DOCUMENTS

| | | |
|---|---|---|
| 3,621,727 | 11/1971 | Cicognani . |
| 3,656,360 * | 4/1972 | Fix ................................... 474/263 X |
| 3,894,900 | 7/1975 | Redmond, Jr. . |
| 3,911,755 * | 10/1975 | Vance, Sr. ........................ 474/263 X |
| 3,941,005 * | 3/1976 | Gardiner, III et al. .......... 474/263 X |
| 3,964,328 * | 6/1976 | Redmond, Jr. ........................ 474/271 |
| 4,024,773 | 5/1977 | Hartman et al. . |
| 4,026,424 * | 5/1977 | Fiorentino ........................ 104/88 X |
| 4,031,768 | 6/1977 | Henderson et al. . |
| 4,109,543 | 8/1978 | Foti . |
| 4,475,968 | 10/1984 | Brew . |
| 4,695,602 | 9/1987 | Crosby et al. . |
| 5,178,586 | 1/1993 | Mizuno et al. . |
| 5,209,961 | 5/1993 | Yokoi . |
| 5,216,079 * | 6/1993 | Crosby et al. ........................ 525/146 |
| 5,284,456 | 2/1994 | Connell et al. . |
| 5,362,281 * | 11/1994 | Dutton et al. ..................... 474/260 X |
| 5,378,206 * | 1/1995 | Mizuno et al. ...................... 474/263 |
| 6,028,137 * | 2/2000 | Mahmud et al. ..................... 524/496 |

FOREIGN PATENT DOCUMENTS

| | | |
|---|---|---|
| 0 240 936 A2 | 10/1987 | (EP) . |
| 0 662 571 A1 | 7/1995 | (EP) . |
| 0695 627 A1 | 2/1996 | (EP) . |

OTHER PUBLICATIONS

The Gates Corporation Technical Developments Bulletin, vol. 2, 11/94, Denver, Colorado, "Toothed Belt with Tetrafluoroethylene Surface".

* cited by examiner

*Primary Examiner*—David A. Bucci
*Assistant Examiner*—Colby Hansen
(74) *Attorney, Agent, or Firm*—M. S. Olson, Esq.; C. H. Castleman, Esq.; S. G. Austin, Esq.

(57) ABSTRACT

Endless belts having driving surfaces comprising a high temperature flexible thermoplastic composite. More particularly, an endless toothed belt having a high temperature-, abrasion- and noise resistant cover element, and which comprises from about 60 percent to about 100 percent by weight of the composite of a high temperature flexible thermoplastic material and from about 0 percent to about 40 percent by weight of the composite of a frictional modifier system, and methods for constructing such belts. Such belts include elastomeric body portions which may preferably be formed from suitable polyurethane materials.

28 Claims, 1 Drawing Sheet

HIGH TEMPERATURE FLEXIBLE THERMOPLASTIC COMPOSITES FOR ENDLESS BELT DRIVING SURFACES

This application claims the benefit of U.S. Provisional Application No. 60/089,016, filed Jun. 12, 1998.

BACKGROUND OF THE INVENTION

The present invention relates to endless belts having driving surfaces comprising a high temperature flexible thermoplastic composite, which composite reduces noise, improves dimensional stability and improves abrasion resistance of the belt compared to conventional belt constructions, while minimizing frictional heat effects in such belts, and more particularly to endless toothed belts having an elastomeric belt body portion, a reinforcement member disposed within the body portion, a wear resistant fabric cover, and a high temperature, abrasion- and noise resistant composite arranged along the wear-resistant fabric cover, which composite is substantially free of the belt body elastomer at its surface, and further to a method for producing such belts. In a preferred embodiment, such belts incorporate elastomeric body portions formed from a polyurethane material.

Endless belts, including V-belts, V-ribbed belts, and flat belting, as well as toothed belts such as synchronous or timing belts and the like, are used in a variety of environments. Examples of power transmission belts, including synchronous belts, V-belts, and V-ribbed belts are disclosed in U.S. Pat. Nos. 3,138,962; 3,200,180; 4,330,287; and 4,332,576. Examples of methods for producing such belts are disclosed in U.S. Pat. No. 3,200,180 as indicated above and U.S. Pat. Nos. 3,772,929 and 4,066,732. These patent references are merely examples of the types of belts and state-of-the-art formation techniques thereof.

Toothed belts are put to particularly good use in high temperature, high speed and high load environments, including various industrial and automotive drive systems. In the automotive area, various factors have contributed to the growing demand for such belts which perform under increasingly high loads and temperatures, which are commonly at 120° C. to 140° C., and are expected to react 150° C. or greater. Under high load, high temperature and high speed conditions, it is common for the teeth of endless toothed belts to deteriorate; the severe shearing stresses on the teeth often result in crack generation and tooth loss. Thus, it is known to incorporate a wear-resistant fabric cover element over the tooth and land portions of such belts in an attempt to alleviate this problem. This improvement however has not proved completely satisfactory.

Performance characteristics of endless belts which have become important in automotive original equipment and after-market applications in recent years include minimal frictional heat generation, quiet belt operation, and dimensional stability, as well as high temperature performance. With respect to endless toothed belts in particular, frictional heat generation and heat build-up reduce the efficiency of the belt, and the higher operating temperatures frequently encountered by these belts can reduce belt life considerably by lowering the tear strength and fatigue life of the tooth, or by attacking the bonds between the belt components, e.g., between the elastomer body and tensile cord embedded therein, and between the elastomer body and the wear resistant fabric cover element. Endless toothed belts having elastomeric body portions constructed of a castable elastomer in particular, e.g., some liquid polyurethane elastomers, while offering a number of significant advantages over conventional rubber belting, including a lower susceptibility to flex fatigue, ease of manufacture and improved load life, often run hotter and noisier than comparable rubber belts due primarily to the higher coefficient of friction of these materials compared to the more conventional non-castable elastomers. This is particularly the case with polyurethane-based belts. Thus, the noise problems and frictional heat generation common to endless toothed belts generally are particularly troublesome in polyurethane belt applications. In particular, a polyurethane belt is generally more aggressive as it enters and leaves the sprocket or sheave and builds up considerable heat at the belt-sprocket or sheave interface.

One proposed solution to the noise problem commonly found in conventional belting has been to reduce the coefficient of friction of the driving surface of the belt. What is meant by the term, "driving surface" within this context is that surface of the belt which forms an interface with either a sprocket, in the case of toothed belting, or a sheave, in the case of V-belts or multi-V-ribbed belts. One such approach involves isolating or removing as much of the elastomer as possible from near the surface of the belt where that surface comes in contact with sprocket teeth or flanges. Such an approach is taken in U.S. Pat. No. 3,772,929. Another method for dealing with the noise and frictional heat generation problems in castable elastomer belting is disclosed in U.S. Pat. No. 3,964,328 wherein a layer of elastomer-impervious material, e.g., polyethylene, is utilized during the casting operation and is bonded to one side of a wear-resistant fabric cover element. A further suggestion has been to incorporate a polytetrafluoroethylene (PTFE) layer over the wear-resistant fabric cover element to decrease the effective coefficient of friction of the driving surface of the belt.

Each of these proposed solutions to the belt noise and/or frictional heat problems in polyurethane belts have come at the expense of increased wear and decreased dimensional stability which may nonetheless exacerbate belt noise. Dimensional variations commonly encountered include increased belt length and an alteration in the distance between the center of the load carrying members of a belt and the bottom surface of the land portions between adjacent longitudinally spaced teeth. In toothed belts, belt length changes generally lead to increased slip noise, which is that noise associated with the tangential- or radial sliding or slip between the belt and the sprocket as each tooth enters and exits a corresponding sprocket. For a belt designed and manufactured properly for a given application, as the belt length increases, the magnitude of the slip increases, resulting in increased slip noise.

Where the fabric cover element of a belt has been modified to address noise concerns, such as by incorporating a high number or size of twisted yarns, or by including a relatively low abrasion-resistant or low temperature laminate over the fabric cover which consequently likely flakes off with use or melts at high temperatures, the belt likely experiences a variation in the distance between the center of the load carrying members of a belt and the bottom surface of the land portions between adjacent longitudinally spaced teeth with use in addition to an increase in belt length. Generally, as the low temperature, low abrasion-resistant laminate flakes or melts off of the fabric layer with continued use, the distance between the center of the load carrying members of the belt and the bottom surface of the land portions between adjacent longitudinally spaced teeth would decrease, eventually exposing the fabric layer of the cover element to the sprocket and ultimately causing deterioration of such layer and exposure of the belt elastomer. This variation further causes poor fit between the tooth or land portions of the belt and the corresponding sprocket, hence accelerating both slip and impact noise. Impact noise is that noise which occurs as a result of radial, i.e., normal contact between the tooth or land portions of the toothed belt and the corresponding portion of the sprocket as each tooth or land portion enters it. A substantially pure PTFE layer incorporated on the surface of a wear-resistant fabric cover element, while resulting in a reduced coefficient of friction, exhibits very poor wear resistance, and thus would likely wear off of the belt with use, again leaving the wear-resistant fabric layer exposed.

Known endless belt constructions have not effectively addressed the combined problems of belt noise, frictional heat generation and dimensional instability. In particular, known endless toothed belt constructions having belt body portions formed from polyurethanes, including conventional polyurethanes, polyurethane-ureas and polyureas, do not possess high temperature surface performance capabilities suitable for automotive applications, e.g., for use within automotive engine compartments wherein temperatures frequently range from about 120° C. to about 140° C., and in the near future are expected to reach or exceed about 150° C.

Consequently, there remains a need to produce an endless belt, including an endless toothed belt for use in high temperature applications, which exhibits reduced noise during belt operation, which does not experience significant frictional heat generation, and which otherwise remains dimensionally stable throughout its life. Additionally, it would be advantageous to produce such a belt having belt body portions formed of a polyurethane, such that the belt would possess high temperature characteristics sufficient for use in automotive applications.

SUMMARY OF THE INVENTION

Accordingly, it is a primary object of the invention to provide an endless belt construction and method therefor which overcome drawbacks of prior constructions, and in which the belt exhibits reduced noise generation, reduced heat generation and improved wear resistance and dimensional stability compared to known belt constructions.

It is a further object of the invention to provide an endless toothed belt construction having a polyurethane-based elastomeric body portion which is suitable for use in high temperature automotive applications including uses within automotive engine compartments, as well as a method for constructing such belt which overcomes drawbacks of prior constructions, in which the belt remains substantially dimensionally stable and exhibits decreased heat generation and noise generation compared to known toothed belt constructions.

To achieve the foregoing and other objects and in accordance with a purpose of the present invention as embodied and broadly described herein, an endless belt, including a V-belt, a V-ribbed belt, flat betting or toothed belts, such as synchronous or timing belts, having a driving surface portion comprising a high temperature flexible thermoplastic composite is provided.

In a further embodiment, an endless toothed belt is provided having a tensile-loaded body portion composed of an elastomeric material, a plurality of spaced teeth bonded with and disposed along the inner periphery of the body portion, a layer of wear-resistant fabric positioned substantially along the periphery of the alternating teeth and land portions of the belt, and a high temperature flexible thermoplastic composite layer positioned substantially along the outer surface of the wear-resistant fabric. The outermost driving surface portion of the belt exhibits improved wear resistance and a lower coefficient of friction compared to the belt body elastomer, thus presenting a surface which exhibits reduced noise generation and frictional heat build-up upon operation of the belt, and improves the belt's overall dimensional stability. In this embodiment, the endless belt may be of any conventional form wherein a wear-resistant fabric is positioned along the tooth and land portions of the belt, including for example, synchronous or timing belts and dual-sided toothed belts.

An advantage is realized when a castable elastomer such as certain liquid polyurethanes are used as the belt body elastomer, where, in the absence of the improvement of the present invention, migration of the belt body elastomer through the wear resistant fabric, as well as belt noise, frictional heat generation and dimensional instability are especially troublesome, and have to date generally precluded the use of such belts in automotive applications. What is meant by the term, "polyurethanes" in this context are suitable polyurethane, polyurethane/urea and polyurea elastomers.

BRIEF DESCRIPTION OF THE DRAWINGS

The accompanying drawings which are incorporated in and form a part of the specification, illustrate preferred embodiments of the invention, and together with a description, serve to explain the principles of the invention. In the several drawings, like numerals designate like parts, and.

DESCRIPTION OF THE PREFERRED EMBODIMENTS

Figure 1:
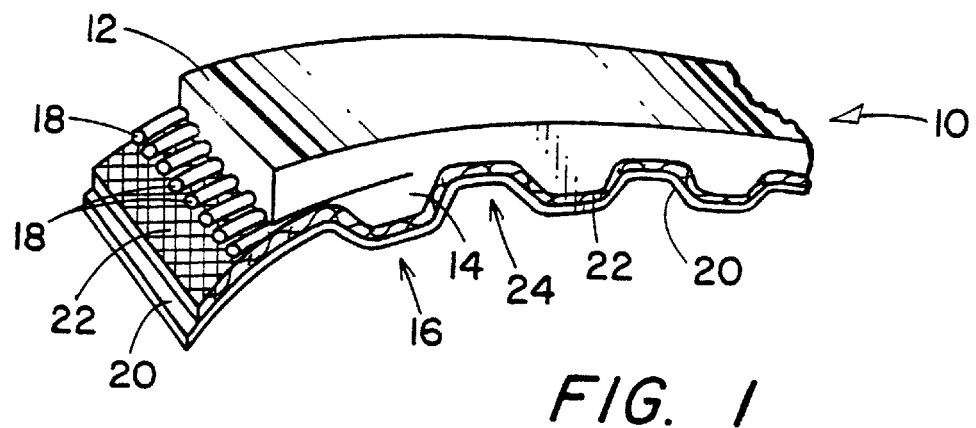
FIG. 1 is a fragmentary, perspective view of a synchronous belt constructed in accordance with one embodiment of the present invention.

Referring to FIG. 1, an endless synchronous-type power transmission belt is shown generally at 10. The belt includes a body having an overcord section 12 formed from an elastomeric material and a series of spaced cogs or teeth 16, also containing an elastomeric material 14. The elastomeric material utilized in the overcord and tooth body are compatible and may be of the same or of a different type of elastomer. The elastomer overcord section 12 is preferably loaded with a reinforcing tensile layer or a plurality of tensile members, which are well known to the art, such as the longitudinally extending and spaced tensile cords 18. These tensile members may consist of one or more strands of a conventional stress-resistant material such as polyamide cord, aramid fibers, fiber glass, polyester cord or wire filaments. The tensile members may be prestressed or impregnated with a suitable material if desired.

A wear-resistant fabric layer 22, or reinforcing fabric intimately fits along the alternating teeth 16 and alternating land portions 24 of the belt to form a face cover therefor. This fabric may be of any desired configuration such as a conventional weave consisting of warp and weft threads at any desired angle, or may consist of pick cords, or of a knitted or braided configuration, or the like. More than one ply of fabric may be employed. If desired, the fabric may be cut on a bias so that the strands form an angle with the direction of travel of the belt. Conventional fabrics may be employed using such materials as cotton, polyester, polyamide, hemp, jute, fiberglass and various other natural and synthetic fibers. In a preferred embodiment of the invention, the fabric layer 22 consists of an expansible wear-resistant fabric in which at least one of the warp or weft threads is made of nylon 6,6.

According to one embodiment of the present invention, the wear-resistant fabric layer 22 carries an adherent layer of a high temperature flexible thermoplastic composite 20 bonded so that, in a preferred embodiment, it adheres to only a portion of the total thickness of the wear-resistant fabric and is positioned along the outer, sprocket-engaging face of the teeth and land portions of the belt. While any suitable castable or non-castable elastomer may be used as the belt body elastomer in this embodiment of the present invention, in a preferred embodiment the elastomeric portions of the belt are formed of a castable polyurethane. In a most preferred embodiment, the elastomeric portions of the belt are constructed of a polyurethane/urea elastomer having high temperature resistance to about 140° C. and low temperature resistance to about −35° C. in dynamic applications, as disclosed in International Patent Publication No. WO 96/02584.

The novel use of a high temperature flexible thermoplastic composite as the driving surface of an endless belt provides a significant improvement in the wear-resistant properties of such belts. The novel use of a high temperature flexible thermoplastic composite layer according to one embodiment of the present invention, as a laminate over a wear-resistant fabric tooth and land covering of an endless toothed belt overcomes the shortcomings of the prior art, by providing a finished endless toothed belt which exhibits minimal noise, which retains substantial dimensional stability for the life of the belt, and which minimizes frictional heat generation. The high temperature flexible thermoplastic composite layer is especially beneficial when employed in endless toothed belts utilizing a castable elastomer such as certain polyurethanes as the main belt body portions; the present invention allows for such belts' use in high temperature environments exemplified by automotive engine compartments, wherein temperatures frequently range from about 120° C. to about 140° C., and in the near future are expected to reach or exceed about 150° C.

As mentioned above, endless toothed belts exhibit various types of noise caused by various sources. Two such types of noise are impact noise and slip noise. Impact noise is that noise which occurs as a result of radial, i.e., normal contact between the tooth or land portions of the belt and the corresponding portion of the sheave or sprocket as each tooth or land portion enters a corresponding sprocket. This type of noise is principally a function of proper tooth and sprocket interaction, pitch fit and the like. Thus, by stabilizing the belt to remain substantially within its original design dimensions, proper tooth and sprocket interaction is improved.

Slip noise is that noise associated with either the tangential or radial sliding or slip between the belt and the sprocket as each tooth enters and exits a corresponding sprocket. As a belt's length increases from its properly designed and manufactured dimensions, the magnitude of the slip increases, resulting in increased slip noise. Slip noise is thus exacerbated by poor fit, such as that resulting from belt length variation which commonly occurs at high temperatures or with the melting or flaking away of prior art belt coverings. The generation of frictional heat and dimensional changes in endless toothed belts are primary sources of both slip and impact noise, as well as of premature belt failure, as manifested in wear such as laminate breakthrough and fabric erosion.

In a preferred embodiment, the high temperature flexible thermoplastic composite is substantially elastomer impervious. By an "elastomer-impervious" composition is meant a composition which bonds mechanically and/or chemically to one side of the wear-resistant fabric layer 22 so that the elastomer-impervious composition seals the outer side only of the fabric, and thereby isolates the belt body elastomer from the outer surface of the fabric layer by preventing the fibers which comprise the outermost surface of the fabric layer from becoming completely penetrated by the elastomer. This is especially beneficial where polyurethanes are used as the elastomeric body portions of the belt. In this manner, the outer surface of the fabric layer remains substantially free of the belt body elastomer. This attribute is discussed at length in U.S. Pat. No. 3,964,328, the contents of which, with respect to the penetration of the laminate material into the wear-resistant fabric cover, is hereby incorporated by reference.

The high temperature flexible thermoplastic composite useful in the present invention comprises a high temperature thermoplastic material which is wear resistant and sufficiently flexible, or may be modified to be sufficiently flexible, to be driven about the increasingly small radius sprockets and/or sheaves commonly encountered in automotive engine compartments. The composite further comprises a frictional modifier system which imparts a reduced coefficient of friction to the composite. It is preferred that the amount of flexible thermoplastic material exceed the amount of frictional modifier, when present, in the composite so that the thermoplastic material, and not the frictional modifier, constitutes the base matrix of the composite. This characteristic is set forth for example in U.S. Pat. No. 5,216,079. This is distinguishable from the incorporation of a substantially pure PTFE layer over the fabric layer of endless toothed belts. A substantially pure PTFE layer exhibits relatively poor wear resistance and therefore would likely wear off with use. While not intending to be limited to one particular theory, it is presently believed that in the subject invention, where PTFE is conversely used as a frictional modifier within a high temperature thermoplastic matrix having excellent abrasion resistance, the material does not wear off with use but remains on the driving surface of the belt, forming a low friction transfer film on the sprocket or sheave surface.

In a preferred embodiment, the high temperature flexible thermoplastic composite useful in the present invention comprises from about 60% to about 100% by weight of a high temperature thermoplastic material, and from about 0% to about 40% by weight of a frictional modifier system. More preferably, the high temperature thermoplastic composite comprises from about 65% to about 99% by weight of a high temperature thermoplastic material and from about 1% to about 35% by weight of a frictional modifier system, and most preferably, the composite comprises from about 75% to about 90% by weight of a high temperature thermoplastic material and from about 10% to about 25% by weight of a frictional modifier system.

The high temperature flexible thermoplastic composite useful in the present invention is characterized by a melting point greater than that of polyethylene, i.e., greater than about 115° C., more preferably greater than about 150° C., and most preferably greater than about 175°. This high temperature, highly wear resistant composite remains substantially intact on the belt's surface for the useful life of the belt, and generally will not melt off at the high temperatures now commonly encountered in engine compartments.

High temperature thermoplastic materials usefull as the major weight component of the composite useful in the present invention preferably have excellent abrasion- or wear resistant properties, and include but are not limited to materials based on polyamides such as nylon 6 and nylon 6,6, and may also include those based on polyolefins and polyesters. In a preferred embodiment, the high temperature thermoplastic material is based on a polyamide, and in the most preferred embodiment, is based on nylon 6. What is meant by the term, "based on" in this context is a material which incorporates as its major functional component the constituent so described. That is, additives, including reinforcing agents, fillers and other common thermoplastic composite additives may be present in the high temperature thermoplastic material, in amounts generally used for thermoplastic composites, but do not form the major functional component thereof.

For use in the present invention, the high temperature thermoplastic material must also be sufficiently flexible to tolerate dynamic operation about increasingly small sprockets and/or sheaves, when applied to the driving surface of a belt. Thus flexible polyamide-based materials such as flexible nylon 6 materials and flexible nylon 6,6 materials, as well as flexible polyolefin materials and flexible polyester materials are preferred. The nylon materials are more preferred in this embodiment of the present invention and may be modified in order to be flexible enough to permit belts incorporating this material to be driven around increasingly small sheaves under dynamic load conditions. Two such flexible nylon materials are available from E.I. DuPont de Nemours, under the trademarks ZYTEL™ FN 727 and ZYTEL™ FN 726, and are proprietary flexibilized nylon 6-based alloys. The most preferred flexible nylon material for use in the present invention is ZYTEL™ FN 727, which has a melting point greater than about 200° C., i.e., about 225° C.

The high temperature flexible thermoplastic composite has good abrasion- or wear resistance, and therefore does not readily flake or wear off of the wear-resistant fabric cover element of the endless belt during the belt's life. Such a composition should have a coefficient of friction which is lower than the coefficient of friction of the belt body elastomer, when present, in order to reduce overall frictional heat buildup and noise, and to improve the overall efficiency of the belt.

To reduce the effective coefficient of friction of the high temperature flexible thermoplastic composite of a preferred embodiment of the present invention below that of the belt body elastomer, the flexible thermoplastic material may be adjusted using an appropriate frictional modifier system. As noted above, the high temperature flexible thermoplastic composite useful in the present invention preferably comprises from about 60% to about 100% by weight of a high temperature flexible thermoplastic material and from about 0% to about 40% by weight of a frictional modifier system. Effective frictional modifiers for use in such frictional modifier systems are those which reduce the effective coefficient of friction of the driving surface as needed to provide the correct interface for the belt and sprocket or sheave, and include but are not limited to polytetrafluoroethylene (PTFE), silicone, aramid, graphite, molybdenum disulfide, and mixtures thereof. Preferred frictional modifiers for use in the frictional modifier systems of the present invention are PTFE and silicone. The preferred amount of each frictional modifier incorporated in the flexible nylon-based material of a preferred embodiment of the present invention depends on the particular type of frictional modifier system utilized. If PTFE alone is used as the frictional modifier system, it is preferably incorporated in an amount of from about 1% to about 40% by weight, more preferably from about 10% to about 20% by weight, and most preferably from about 15% to about 18% by weight of the total composite. Where PTFE and silicone are used in combination as the frictional modifier system, PTFE is preferably incorporated in an amount of from about 1% to about 40% by weight, and silicone is preferably incorporated in an amount of from about 0.10% to about 10% by weight of the composite. More preferably in this case, PTFE is used in an amount of from about 10% to about 20% by weight and silicone is used in an amount of from about 0.5% to about 3% by weight of the composite. Most preferably in this case, PTFE is used in an amount of from about 15% to about 20% by weight and silicone is used in an amount of from about 1% to about 2% by weight of the composite. In all of the above cases, the balance of the high temperature flexible thermoplastic composite comprises the high temperature flexible thermoplastic material. In a preferred embodiment, the high temperature flexible thermoplastic composite consists essentially of the high temperature flexible thermoplastic material and the frictional modifier system.

One organization possessing the capability to blend the preferred base flexible nylon with frictional modifier systems to form a flexible nylon-based matrix having a frictional modifier component, and which has successfully compounded such materials for Applicant, is LNP Engineering Plastics, Inc. of Exton, Pa. That corporation offers some nylon-based systems commercially under the trademark, LUBRICOMP™.

The improvement provided by the present invention would provide significant benefits in all endless belt applications. In such applications, the high temperature flexible thermoplastic composite would preferably form the driving surface portion of the belts. In those belts which utilize a wear-resistant fabric cover over an elastomeric body portion, the composite forms a laminate layer bonded to the outer surface of the wear-resistant fabric cover. Both castable and non-castable elastomers may be used as the belt body portions in this embodiment of the present invention. What is meant by "castable elastomer" in the belt building context of the present invention is one which is substantially liquid as it is introduced into a belt mold cavity, and is thereafter cured or polymerized. These elastomers may also include those capable of being processed according to Reaction Injection Molding techniques, which are well known to the art. What is meant by the term "non-castable elastomer" in the belt building context of the present invention is one which is substantially solid as it is formed into the elastomeric portions of the belt, and is thereafter cured or vulcanized. Non-castable elastomers useful as the belt body portions of such belts which would likely enjoy the benefits provided by the present invention include for example, chloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, butadiene rubber (BR), natural rubber (NR) and ethylene propylene diene terpolymer elastomer (EPDM).

In a preferred embodiment, the belt body elastomer is formed of a suitable castable elastomer. Various types of elastomeric materials are available which may be cast and which would be suitable according to the subject invention.

Examples are castable liquid elastomers including but not limited to castable polyurethanes (including conventional polyurethanes, polyurethane/ureas and polyureas), plastisols, organosols, liquid chloroprenes, liquid polysulfides, liquid rubbers, silicones, epoxies, urethanes, polyester based resins, polyether based resins, and the like. Most thermoplastic elastomers are also envisioned within this context. Polyurethane elastomers are generally preferred at present because of their favorable tensile strength and abrasion resistance and their satisfactory modulus and elasticity. In a preferred embodiment, the main belt body portion is formed of a polyurethane-urea having high temperature resistance to 140° C. and low temperature resistance to −35° C. in dynamic applications. These polyurethanes may be prepared in any conventional manner, such as by compounding a polyurethane prepolymer with a chain extending agent, and optionally an amount of plasticizer or other ingredient if desired. Conventional chain extenders may be utilized, which are generally known to the art.

Wear and the dimensional changes accompanying wear are primary sources of belt slip noise, impact noise and premature failure in endless toothed belts. In order to compare the dimensional stability and wear characteristics of a preferred embodiment of the high temperature flexible thermoplastic composite to a polyethylene laminate at high temperatures, the following analysis was performed, which was specifically designed to simulate belt wear at high temperature. A FALEX™ Multi-Specimen apparatus was equipped with a circular sample holder. Polymer thrust washers of the formulas described hereinafter, each having an outer diameter of 1.125", an inner diameter of 0.890", and having a thickness of 0.125" were first weighed, then mounted on the sample holder, and then repeatedly subjected to a smooth wear surface under a continuous unidirectional motion at 1280 RPM under a 10 pound load at the temperatures and for the time periods shown in Table 1. Weight loss was then determined to quantify wear.

Sample 1 was a thrust washer having the above dimensions and comprising a high temperature flexible thermoplastic composite of the formula, 85% by weight ZYTEL™ FN 727, and 15% by weight PTFE. Sample 2 was a thrust washer having the same dimensions and comprising a high temperature flexible thermoplastic composite of the formula, 80% ZYTEL™ FN 727, 18% PTFE, 2% silicone. Comparative Sample A was a thrust washer having the same dimensions and comprising a blend of high and low density polyethylene having a melt index of 10.2 g/10 min., and a first melting transition of 112° C. and a second melting transition of 133° C. It is generally accepted in the art that the first melting transition of such blends represents the use- or service melting point of the material. Comparative Sample B was a thrust washer having the same dimensions and comprising a low density polyethylene having a melt index of 2.5 g/10 min., and a melting point of 115° C.

TABLE 1

WEAR ANALYSIS

|  | | Comparative | |
|---|---|---|---|
|  | Sample 1 | Sample 2 | Sample A | Sample B |
| 24 hour test at 20° C. | | | | |
| Coefficient of friction | 0.69 | 0.47 | 0.7 | 0.7 |
| Wear (mg) | 1.70 | 0.50 | 9.5 | 119.6 |
| 72 hour test at 100° C. | | | | |
| Coefficient of friction | 0.50 | 0.48 | 0.5 | * |
| Wear (mg) | 5.30 | 4.50 | 1.9 | * |
| 72 hour test at 140° C. | | | | |
| Coefficient of friction | 0.46** | 0.43 | N/A | N/A |
| Wear (mg) | 5.5** | 11 | N/A | N/A |
| Samples aged 4 days at 150° C. Tested at 100° C. | | | | |
| Coefficient of friction | 0.60 | 0.75 | N/A | N/A |
| Wear (mg) | (+0.30) | 0.10 | N/A | N/A |

*-Comparative Sample B ran only 4 minutes at 100° C. prior to thrust washer destruction via flaking.
**-Test was stopped after 35 hours for Sample 1.
N/A-Comparative Samples A and B could not be tested at 140° C., or, for aged samples, at 100° C. due to thrust washer destruction via melting.

The results of the above analyses show that while exhibiting similar coefficients of friction, when tested after 24 hours at 20° C., the polyethylene thrust washers exhibited from about 5 to about 100 times the wear of the high temperature flexible thermoplastic composite samples. In actual testing, Comparative Sample A ran only 21 hours prior to flaking-type disintegration, and Comparative Sample B ran only 18 hours prior to flaking-type disintegration. In addition, polyethylene Comparative Samples A and B substantially melted after 4 days aging at 150° C., thus indicating that prolonged exposure to the high temperatures anticipated for automotive drive systems would likely be undesirable. In sharp contrast, Samples 1 and 2 based on frictionally modified ZYTEL™ FN 727 not only withstood 4 days of 150° C. heat aging, but exhibited improved wear resistance at 100° C. over similarly analyzed un-aged samples. With respect to the performance of Comparative Sample A under the 72-hour test at 100° C., it is believed that the decrease in wear exhibited by this sample compared to its performance at the shorter, lower temperature test, was indicative of a non-linear wear response, which while not a common occurrence, is known to occur sporadically for some materials at high temperatures.

Notably, the adequacy of a given material for the high and low temperature dynamic applications of the present claims is reflected in its performance relative the entirety of testing disclosed in Table 1. That is, the performance of a given material under all the analyses disclosed above bears on that material's ability to perform adequately in the claimed environment, thus a material behaving adequately under only one or two such tests but performing inadequately under others would not be appropriate for belt usage.

Figure 2:
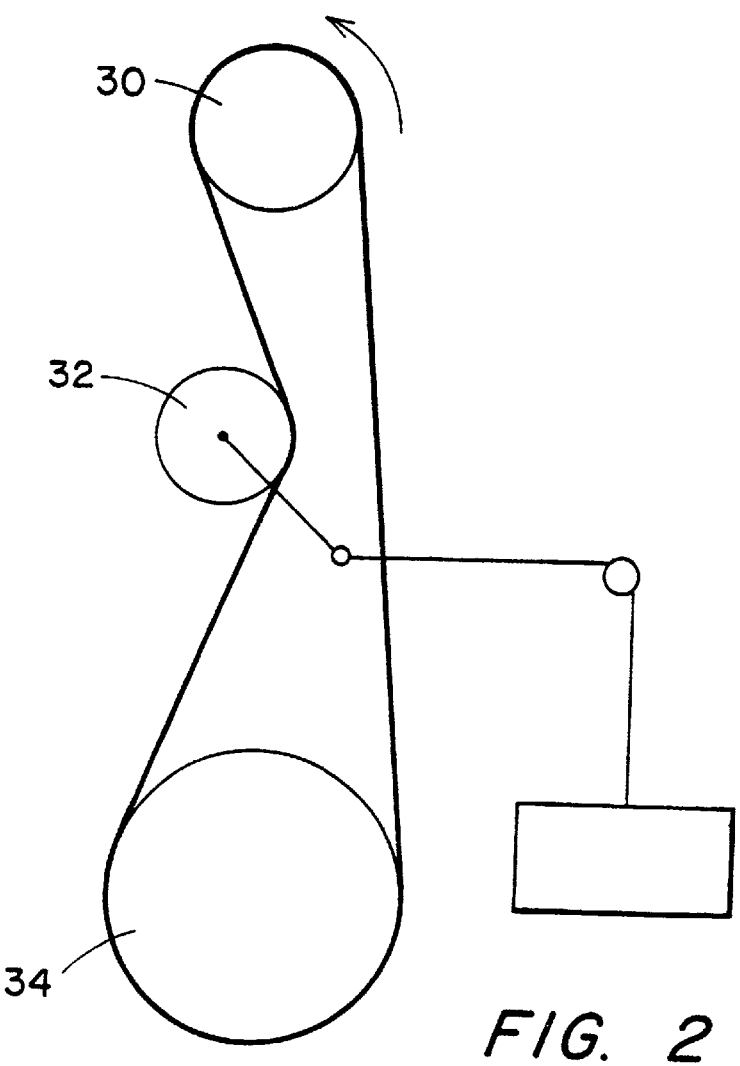
FIG. 2 is a schematic drawing of a high temperature resistance analysis apparatus utilized to illustrate one aspect of an embodiment of the present invention.

To further illustrate the improvement in wear and dimensional stability, and hence, in potential noise reduction of the inventive composite over prior art polyethylene laminates, two endless synchronous belts of the description given for FIG. 1 were subjected to a heat resistance test, the schematic for which is shown as FIG. 2. Each belt included elastomeric body portions comprising a polyurethane/urea elastomer as described in International Patent Publication No. WO 96/02584, at page 16, as example 8 of Table 2. Belt 1 included a 0.003 inch (0.0076 cm) layer of a high temperature flexible thermoplastic composite of the formula, 85% by weight ZYTEL™ FN 727, and 15% by weight PTFE, which was bonded to the outer surface of its wear-resistant fabric cover. Comparative Belt A included a 0.003 inch (0.0076 cm) layer of a blend of high and low density polyethylene having a melt index of 10.2 g/10 min., and melting transitions of 112° C. and 133° C., which was bonded to the outer surface of its wear-resistant fabric cover. The fabric cover for the belts was a nylon stretch fabric having a thickness of about 0.050 inches (2 mm) and a density of about 778 g/m$^2$, and was treated with a first dip comprising a resorcinol formaldehyde rubber latex ("RFL") and a second dip comprising an adhesive rubber composition compatible with the latex of the RFL, and compatible with the underlying belt elastomer. Prior to lamination, all of the fabrics were first corona treated and then flame treated to a point sufficient to improve adhesion of the laminate to the fabric layer without degrading the wear-resistant fabric or underlying materials.

The high temperature resistance analysis was a no load, i.e., zero horsepower, test which was performed in a hot box at 150° C. FIG. 2 illustrates a schematic of this analysis in which the driver sprocket 30 was a 20-groove, 9.525 mm pitch having the RU profile. Belt tension of 15 kg was applied by means of armature on a 52 mm backside idler 32. The driven sprocket 34 was a 40-groove, 9.525 mm pitch having the RU profile. For the comparison of Belt 1 and Comparative Belt A, the belts were first measured, then mounted on the test apparatus and then re-measured after approximately 500 and 1000 hours on test to compare material loss between the polyethylene and the high temperature flexible thermoplastic composite laminates. After 500 hours of operation, the polyethylene laminate of Comparative Belt A experienced an approximate 0.11 mm loss in thickness compared to a 0.02 mm loss in thickness for the high temperature flexible thermoplastic composite laminate of Belt 1. After 1000 hours of operation, the polyethylene laminate of Comparative Belt A experienced an approximate 0.18 mm loss in thickness, compared to an approximate 0.08 mm loss in thickness for the high temperature flexible thermoplastic composite laminate of Belt 1. While not intending to be limited by any particular theory, it is presently believed that in both the case of the comparative and inventive belt constructions, upon application, the laminate material conforms to and at least partially molds itself about the fibers of the wear-resistant fabric. Under the test described above, and with respect to the comparative belt samples, it is believed that not only did the laminate wear away, but portions of the actual wear-resistant fabric cover wore away as well. This is evident in the measured quantity of material lost for those comparative samples.

While the polyethylene laminates and the high temperature flexible thermoplastic composites used in the above-described analyses exhibited similarly low coefficients of friction, thus potentially exhibiting approximately equivalent low frictional heat generation, the latter exhibited greatly improved wear resistance. The results of these analyses indicate that the inventive belts incorporating the high temperature flexible thermoplastic composite as their driving surface interface portions exhibit substantially improved dimensional and wear resistant characteristics compared to belts having a polyethylene layer, and thus are likely to enjoy substantially longer belt life at high temperature, as well as decreased slip and impact noise. It is presently believed that the belts of the present invention would be able to tolerate significantly higher tension in use compared to known belt constructions, due to the inventive belts' improved high temperature performance capabilities, as well as their excellent mechanical characteristics, including resistance to cold flow.

In a preferred embodiment of the present invention relating to endless toothed belts, the above-described belt may be produced by the steps comprising (1) bonding a high temperature flexible thermoplastic composite layer to preferably only one side of a wear-resistant fabric layer, (2) forming a mold cavity defined by a mold mandrel and an outer shell, one of the mandrel or shell having a plurality of notches corresponding to the shape of the teeth or cogs, (3) wrapping the bonded wear-resistant fabric about the surface of the notched mold portion in a manner such that the layer of high temperature flexible thermoplastic composite is adjacent the notched mold portion, (4) applying a tensile layer about the wear-resistant fabric, (5) introducing a substantially liquid elastomeric material into the mold cavity and (6) polymerizing the thus formed product.

In a preferred method of constructing this embodiment of the present invention, the high temperature flexible thermoplastic composite is first bonded or otherwise adhered to one side only of the wear-resistant fabric by means of known lamination procedures, utilizing, e.g., standard film-forming extrusion apparatus. Where such procedure is utilized, the high temperature flexible thermoplastic composite as is it is extruded onto the fabric has a thickness of from about 0.001 inches (0.002 cm.) to about 0.006 inches (0.015 cm.), more preferably of from about 0.002 inches (0.005 cm.) to about 0.004 inches (0.010 cm.), and most preferably of from about 0.0025 (0.0063 cm.) inches to about 0.0035 inches (0.0089 cm.). The high temperature flexible thermoplastic composite layer may also be adhered to the wear-resistant fabric by methods such as powder coating or latex. deposition, or by means of emulsion-suspension applications. The next step involves applying a tensile layer, such as by helically winding tensile cord around the circumference of the mandrel portion of a mold on top of the bonded wear-resistant fabric layer, and forcing the bonded fabric to essentially conform to the surface thereof. For toothed belt manufacture, a notched mold formed from a mold mandrel and an outer shell having a notched outer surface may be utilized. In such case, the bonded fabric is forced to conform to the notches of the outer surface. Adhesion of the thermoplastic composite laminate layer to the wear resistant fabric may be improved by the use of flame-, plasma- and/or corona treatment or the like, which techniques are generally known to the art. Finally, the substantially liquid elastomeric material is introduced into the mold cavity and the material is polymerized to form the desired belt configuration. Centrifugal casting combined with applied vacuum may be employed for good results. After polymerization has taken place and sufficient cure time allowed, the mold may be disassembled and the resultant sleeve of belts may be cut into individual belts of desired width. A skiving operation may be employed to give the desired final configuration to the teeth and/or the overcord side of the belt. In this latter regard, the overcord of the belt may carry multiple "V's", cogs, or other configurations as desired. Methods for producing castable belts are generally known, and are discussed for example in U.S. Pat. No. 3,964,328, the contents of which regarding belt production and preferred belt configuration are hereby incorporated by reference. A preferred general technique for producing the castable elastomer belts of the type used in the present invention is described in U.S. Pat. No. 3,138,962 (Haines, et. al.) and U.S. Pat. No. 3,200,180 (Russ et. al.)

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element that is not specifically disclosed herein.

What is claimed is:

1. An endless belt having a driving surface portion, and characterized in that said driving surface portion comprises a high temperature flexible thermoplastic composite, said high temperature flexible thermoplastic composite having a melting point higher than about 150° C., and comprising from about 60 percent to about 100 percent by weight based on the total weight of said composite of a high temperature flexible thermoplastic material, and from about 0 percent to about 40 percent by weight based on the total weight of the composite of a frictional modifier system.

2. The belt of claim 1 further comprising a tensile-loaded body portion comprising an elastomeric material said high temperature flexible thermoplastic composite having a coefficient lower than that of said elastomeric material of said body portion.

3. An endless toothed belt, comprising;
   a. a tensile-loaded body portion comprising an elastomeric material;
   b. a plurality of spaced teeth bonded with and disposed along the inner periphery of said body portion; and
   c. a layer of wear-resistant fabric positioned substantially along the periphery of the alternating teeth and land portions of said belt, and characterized in that a high temperature flexible thermoplastic composite layer is positioned substantially along and bonded to at least a portion of the outer surface of said wear-resistant fabric, said composite layer exhibiting a lower coefficient of friction than that of said elastomeric material, and a melting point greater than about 150° C., said high temperature flexible thermoplastic composite comprising from about 60 percent to about 100 percent by weight based on the total weight of said composite of a high temperature flexible thermoplastic material, and from about 0 percent to about 40 percent by weight based on the total weight of said composite of a frictional modifier system.

4. The belt of claim 3 wherein said high temperature thermoplastic composite is substantially elastomer impervious, and whereby said high temperature thermoplastic composite is adapted and arranged such that the outermost driving surface portion of said belt is substantially free of the elastomeric material.

5. The belt of claim 3 wherein the outer surface of said wear-resistant fabric is composed of fibers, each of which are free from total penetration by said elastomeric material of said body portion.

6. The belt of claim 3 wherein the side of the wear-resistant fabric opposite the bonded side has a free surface adhering to at least a portion of the elastomeric material of said body portion.

7. The belt of claim 3 wherein said elastomeric material is one selected from the group consisting of castable elastomers and non-castable elastomers.

8. The belt of claim 7 wherein said non-castable elastomers are selected from the group consisting of chloroprene rubber, acrylonitrile butadiene rubber, hydrogenated acrylonitrile butadiene rubber, styrene-butadiene rubber, alkylated chlorosulfonated polyethylene, epichlorohydrin, butadiene rubber, natural rubber and ethylene propylene diene terpolymer elastomer.

9. The belt of claim 7 wherein said castable elastomers are selected from the group consisting of castable polyurethane elastomers, castable polyurethane/urea elastomers, castable polyurea elastomers, plastisols, organosols, liquid chloroprenes, liquid polysulfides, liquid rubbers, silicones, epoxides, urethanes, polyester based resins, polyether based resins, polyamide based resins and thermoplastic elastomers.

10. The belt of claim 9 wherein said castable elastomer is said castable polyurethane/urea elastomer.

11. The belt of claim 3 wherein said high temperature flexible thermoplastic composite has a melting point greater than about 175° C.

12. The belt of claim 3 wherein said high temperature flexible thermoplastic material is one based on a material selected from the group consisting of:
   a) polyamides;
   b) polyolefins; and,
   c) polyesters.

13. The belt of claim 12 wherein said polyamide is one selected from the group consisting of nylon 6 and nylon 6,6.

14. The belt of claim 13 wherein said polyamide is said nylon 6.

15. The belt of claim 3 wherein said high temperature flexible thermoplastic composite comprises said high temperature flexible thermoplastic material and said frictional modifier system, and said frictional modifier system is one selected from the group consisting of:
   a) polytetrafluoroethylene;
   b) silicone,
   c) aramid;
   d) graphite;
   e) molybdenum disulfide; and
   f) mixtures thereof.

16. The belt of claim 15 wherein said high temperature flexible thermoplastic composite comprises said high temperature flexible thermoplastic material and from about 10 percent to about 20 percent by weight based on the total weight of said composition, of said frictional modifier system, and said frictional modifier system comprises said polytetrafluoroethylene.

17. The belt of claim 16 wherein said high temperature flexible thermoplastic composite comprises from about 15 percent to about 18 percent by weight based on the total weight of said composite of said frictional modifier system.

18. The belt of claim 15 wherein said high temperature flexible thermoplastic composite comprises said high temperature flexible thermoplastic material and said frictional modifier system, and said frictional modifier system comprises a mixture of polytetrafluoroethylene and silicone.

19. The belt of claim 18 wherein said high temperature flexible thermoplastic composite comprises from about 1 percent to about 40 percent by weight based on the total weight of said composite of polytetrafluoroethylene, and from about 0.10 percent to about 10 percent by weight based on the total weight of said composite of silicone.

20. The belt of claim 18 wherein said high temperature flexible thermoplastic composite comprises from about 10 percent to about 20 percent by weight based on the total weight of said composite of polytetrafluoroethylene and from about 0.50 percent to about 3 percent by weight based on the total weight of said composite of silicone.

21. The belt of claim 18 wherein said high temperature flexible thermoplastic composite comprises from about 15 percent to about 20 percent by weight based on the total weight of said composite of polytetrafluoroethylene, and from about 1 percent to about 2 percent by weight based on the total weight of said composite of polytetrafluoroethylene and from about 1 percent to about 2 percent by weight based on the total weight of said composite of silicone.

22. In an endless toothed belt, comprising;
   a) a tensile-loaded body portion comprising a polyurethane/urea elastomer;
   b) a plurality of spaced teeth bonded with and disposed along the periphery of said body portion;
   c) a layer of wear-resistant fabric positioned substantially along the periphery of the alternating teeth and land portions of said belt; the improvement comprising a high temperature flexible thermoplastic composite layer positioned substantially along and bonded to at least a portion of the outer surface of the wear-resistant fabric and forming the driving surface of said belt, said composite layer exhibiting a lower coefficient of friction than said polyurethane/urea elastomer, and a melting point greater than about 150° C., said high temperature flexible thermoplastic composite comprising a flexible nylon 6-based alloy and from about 15 percent to about 18 percent by weight based on the total weight of said composite of a frictional modifier system comprising polytetrafluoroethylene.

23. The belt of claim 22 wherein said high temperature thermoplastic composite is substantially elastomer impervious, and whereby said high temperature thermoplastic composite is adapted and arranged such that the outermost driving surface portion of said belt is substantially free of said polyurethane/urea elastomer.

24. The belt of claim 22 wherein said polyurethane/urea elastomer exhibits high temperature resistance to 140° C. and low temperature resistance to −35° C. in dynamic applications.

25. In an endless toothed belt, comprising;
   d) a tensile-loaded body portion comprising polyurethane/urea elastomer;
   e) a plurality of spaced teeth bonded with and disposed along the periphery of said body portion;
   f) a layer of wear-resistant fabric positioned substantially along the periphery of the alternating teeth and land portions of said belt; the improvement comprising a high temperature flexible thermoplastic composite layer positioned substantially along and bonded to at least a portion of the outer surface of the wear-resistant fabric and forming the driving surface of said belt, said composite layer exhibiting a lower coefficient of friction than said polyurethane/urea elastomer, and a melting point greater than about 150° C., said high temperature flexible thermoplastic composite comprising a flexible nylon 6-based alloy and a frictional modifier system comprising from about 15 percent to about 20 percent by weight based on the total weight of said composite of polytetrafluoroethylene, and from about 1 percent to about 2 percent by weight based on the total weight of said composite of silicone.

26. The belt of claim 25 wherein said high temperature thermoplastic composite is substantially elastomer impervious, and whereby said high temperature thermoplastic composite is adapted and arranged such that the outermost driving surface portion of said belt is substantially free of said polyurethane/urea elastomer.

27. The belt of claim 25 wherein said polyurethane/urea elastomer exhibits high temperature resistance to about 140° C. and low temperature resistance to about −35° C. in dynamic applications.

28. In a process for constructing an endless toothed belt having a tensile-loaded body portion comprising a castable polyurethane material, a plurality of spaced teeth bonded with and disposed along the periphery of said body portion, a layer of wear-resistant fabric positioned substantially along the periphery of the alternating teeth and land portions of said belt, comprising the steps of:
   a) bonding a laminate layer to at least one side of a wear-resistant fabric layer;
   b) forming a notched mold cavity defined by a mold mandrel and an outer shell having a notched portion;
   c) wrapping the bonded wear-resistant fabric about a surface of the mold cavity such that the laminate layer is adjacent the notched mold portion;
   d) applying a tensile layer about said wear-resistant fabric;
   e) introducing a substantially liquid castable polyurethane material into said mold cavity, and;
   f) polymerizing said polyurethane material to form a belt, the improvement comprising said laminate layer being in the form of a high temperature flexible thermoplastic composite, said composite exhibiting a lower coefficient of friction than that of said elastomeric material, and a melting point greater than about 150° C., said high temperature flexible thermoplastic composite comprising from about 60 percent to about 100 percent by weight of said composite of a high temperature flexible thermoplastic material and from about 0 percent to about 40 percent by weight of said composite of a frictional modifier system.

* * * * *

UNITED STATES PATENT AND TRADEMARK OFFICE
CERTIFICATE OF CORRECTION

PATENT NO.    : 6,296,588 B1
DATED         : October 2, 2001
INVENTOR(S)   : Ciemniecki, Scott L., Rorrer, Ronald A.L. and Visser, Harry D.

It is certified that error appears in the above-identified patent and that said Letters Patent is hereby corrected as shown below:

<u>Column 15,</u>
Lines 2-4, delete "and from about 1 percent to about 2 percent by weight based on the total weight of said composite of polytetrafluoroethylene"

Signed and Sealed this

Twentieth Day of May, 2003

JAMES E. ROGAN
*Director of the United States Patent and Trademark Office*